United States Patent
Zhang et al.

(10) Patent No.: US 12,530,170 B2
(45) Date of Patent: *Jan. 20, 2026

(54) VECTOR OPERATION ACCELERATION WITH CONVOLUTION COMPUTATION UNIT

(71) Applicant: MOFFETT INTERNATIONAL CO., LIMITED, Hong Kong (HK)

(72) Inventors: Xiaoqian Zhang, San Jose, CA (US); Zhibin Xiao, Los Altos, CA (US); Changxu Zhang, Santa Clara, CA (US); Renjie Chen, Mountain View, CA (US)

(73) Assignee: Moffett International Co., Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,441

(22) Filed: Apr. 17, 2024

(65) Prior Publication Data
US 2024/0264802 A1    Aug. 8, 2024

Related U.S. Application Data

(63) Continuation of application No. 18/130,311, filed on Apr. 3, 2023, now Pat. No. 12,020,001, which is a
(Continued)

(51) Int. Cl.
G06F 7/544    (2006.01)
G06F 7/50     (2006.01)

(52) U.S. Cl.
CPC .............. *G06F 7/5443* (2013.01); *G06F 7/50* (2013.01)

(58) Field of Classification Search
CPC .......... G06F 7/5443; G06F 7/50; G06F 7/523; G06F 7/485; G06F 7/4876; G06F 7/4912;
(Continued)

(56) References Cited

U.S. PATENT DOCUMENTS

| 11,347,916 B1 | 5/2022 | Desai et al. |
| 11,494,627 B1 | 11/2022 | Li et al. |

(Continued)

FOREIGN PATENT DOCUMENTS

| CN | 112204579 A | 1/2021 |
| CN | 113692592 A | 11/2021 |

(Continued)

OTHER PUBLICATIONS

Non-Final Office Action dated Dec. 16, 2022, issued in related U.S. Appl. No. 17/944,772 (16 pages).
(Continued)

*Primary Examiner* — Jyoti Mehta
*Assistant Examiner* — Huy Duong
(74) *Attorney, Agent, or Firm* — Sheppard Mullin Richter & Hampton LLP

(57) ABSTRACT

This application describes hybrid hardware accelerators, systems, and apparatus for performing various computations in neural network applications using the same set of hardware resources. An example accelerator may include weight selectors, activation input interfaces, and a plurality of Multiplier-Accumulation (MAC) circuits organized as a plurality of MAC lanes Each of the plurality of MAC lanes may be configured to: receive a control signal indicating whether to perform convolution or vector operations; receive one or more weights according to the control signal; receive one or more activations according to the control signal; and generate output data based on the one or more weights and the one or more input activations according to the control signal and feed the output data into an output buffer. Each of the plurality of MAC lanes includes a plurality of multiplier circuits and a plurality of adder-subtractor circuits.

19 Claims, 10 Drawing Sheets

Related U.S. Application Data continuation of application No. 17/944,772, filed on Sep. 14, 2022, now Pat. No. 11,726,746.

(58) Field of Classification Search
CPC .......... G06F 7/496; G06F 17/16; G06F 17/15; G06F 17/153; G06F 2207/4824; G06N 3/04; G06N 3/063; G06N 3/08; G06N 3/02

See application file for complete search history.

(56) References Cited

U.S. PATENT DOCUMENTS

| | | | |
|---|---|---|---|
| 11,726,746 | B1 | 8/2023 | Zhang et al. |
| 2015/0130819 | A1* | 5/2015 | Peng .................. G06T 15/04 345/501 |
| 2017/0316312 | A1 | 11/2017 | Goyal et al. |
| 2017/0357891 | A1* | 12/2017 | Judd .................. G06N 3/049 |
| 2018/0307976 | A1 | 10/2018 | Fang et al. |
| 2019/0065188 | A1 | 2/2019 | Shippy et al. |
| 2020/0050918 | A1* | 2/2020 | Chen .................. G06N 3/04 |
| 2020/0074293 | A1* | 3/2020 | Chin .................. G06F 7/575 |
| 2020/0089506 | A1 | 3/2020 | Power et al. |
| 2020/0104167 | A1 | 4/2020 | Chen et al. |
| 2020/0394516 | A1 | 12/2020 | Chen et al. |
| 2021/0208884 | A1 | 7/2021 | Song |
| 2021/0295140 | A1 | 9/2021 | Holm et al. |
| 2021/0319290 | A1 | 10/2021 | Mills et al. |
| 2021/0326683 | A1 | 10/2021 | Narayanaswami et al. |
| 2021/0357748 | A1* | 11/2021 | Shin .................. G06N 3/06 |
| 2022/0035629 | A1* | 2/2022 | Kwon .................. G06N 3/045 |
| 2022/0036243 | A1 | 2/2022 | Das et al. |
| 2022/0101083 | A1 | 3/2022 | Mody et al. |
| 2022/0129320 | A1* | 4/2022 | Mohapatra .......... G06N 20/00 |
| 2022/0180187 | A1* | 6/2022 | Kim .................. G06N 3/063 |
| 2022/0188073 | A1 | 6/2022 | Bowman et al. |
| 2022/0253716 | A1 | 8/2022 | Choudhury et al. |
| 2023/0012553 | A1* | 1/2023 | Ahmadi .................. G06F 17/16 |
| 2023/0062217 | A1 | 3/2023 | Cassidy et al. |
| 2023/0418559 | A1* | 12/2023 | Rossi .................. G06F 7/50 |

FOREIGN PATENT DOCUMENTS

| | | |
|---|---|---|
| CN | 114402337 A | 4/2022 |
| EP | 3555814 A1 | 10/2019 |

OTHER PUBLICATIONS

Notice of Allowance mailed Mar. 24, 2023, issued in related U.S. Appl. No. 17/944,772 (13 pages).

PCT International Search Report and the Written Opinion mailed Dec. 1, 2023, issued in related International Application No. PCT/CN2023/116979 (10 pages).

Non-Final Office Action dated Dec. 22, 2023, issued in related U.S. Appl. No. 18/130,311 (18 pages).

Wu, Ning. "A Reconfigurable Convolutional Neural Network-Accelerated Coprocessor Based on RISC-V Instruction Set." Www. Researchgate. Net/, 2020, www.researchgate.net/publication/342227564_A_Reconfigurable_Convolutional_Neural_Network-Accelerated_Coprocessor_Based_on_RISC-V_Instruction_Set. (Year: 2020).

Extender European Search Report dated Sep. 26, 2025, issued in European Patent Application No. 23864604.6 (11 pages).

Tianshi Chen et al., "DianNao: A Small-Footprint High-Throughput Accelerator for Ubiquitous Machine-Learning," ASPLOS '14, Mar. 1, 2024, pp. 269-283.

Li Du et al., "A Reconfigurable Streaming Deep Convolutional Neural Network Accelerator for Internet of Things," Aug 16, 2017, Retrieved from the Internet: URL:https://arxiv.org/pdf/1707.02973, retrieved on Sep. 8, 2025, pp. 1-10.

Zidong Du et al., "ShiDianNao: Shifting Vision Processing Closer to the Sensor," Jun. 17, 2015, Retrieved from the Internet: URL:https://ieeexplore.ieee.org/document/7284058, retrieved on Sep. 8, 2025, pp. 92-104.

* cited by examiner

VECTOR OPERATION ACCELERATION WITH CONVOLUTION COMPUTATION UNIT

CROSS REFERENCE TO RELATED APPLICATION

The present application is a continuation of U.S. patent application Ser. No. 18/130,311 filed on Apr. 3, 2023, which is a continuation of U.S. patent application Ser. No. 17/944,772 filed on Sep. 14, 2022. The entire contents of all of the above-identified applications are incorporated herein by reference.

TECHNICAL FIELD

The disclosure generally relates to a hardware design for improving neural network computing efficiency, in particular, a hybrid convolution-vector operation PE (processing entity) cluster for processing neural network computations such as convolutions and vector operations.

BACKGROUND

Neural Network (NN) computation involves convolution computations and various vector operations, such as vector reduce operations (e.g., reduce max/min/sum/mean or reduce index) or pooling operations (e.g., max pooling, average pooling). Existing hardware architectures rely on SIMD (Single Instruction Multiple Data) vector processors or dedicated hardware (e.g., Tensor Processing Unit (TPU) or other ASIC designs) to implement these vector operations in addition to the processing units for handling the convolution computations. The vector processors are capable of handling one vector at a time, but inefficient for processing multiple vectors in parallel. Also, SIMD processor may require special hardware to perform operations across multiple elements in the same vector for pooling operations or preliminary operations (such as transpose operation) before performing the reduction operations. Furthermore, the requirement of installing standalone hardware vector processors to handle the vector operations in NN computations may increase the cost and design complexity of NN processing units.

SUMMARY

Various embodiments of the present specification may include hardware accelerators, PE clusters, and systems for handling convolution computations and vector operations using a same set of hardware.

In some aspects, the techniques described herein relate to a vector operation accelerator for neural network computations. The accelerator may include a plurality of weight selectors configured to obtain weights; a plurality of activation input interfaces configured to obtain activations; and a plurality of Multiplier-Accumulation (MAC) circuits organized as a plurality of MAC lanes. In some embodiments, each of the plurality of MAC lanes may be configured to: receive a control signal indicating whether to perform convolution or vector operations; receive one or more weights from at least one of the plurality of weight selectors according to the control signal; receive one or more activations from at least one of the plurality of activation input interfaces according to the control signal; and generate output data based on the one or more weights and the one or more input activations according to the control signal and feed the output data into an output buffer, wherein: each of the plurality of MAC lanes includes a plurality of first circuits for performing multiplication operations and a plurality of second circuits for performing addition or subtraction operations according to the control signal.

In some aspects, the plurality of second circuits within the MAC lane are organized as a tree, and second circuits at a leaf level of the tree are configured to receive data from the plurality of first circuits.

In some aspects, each of the plurality of second circuits is configured to: receive a first input and a second input; determine whether to perform addition or subtraction based on the control signal; in response to the control signal indicting performing addition, generate a sum or an average of the first input and the second input; and in response to the control signal indicating performing subtraction, generate a min or max between the first input and the second input.

In some aspects, the first input and the second input each includes a vector with a same number of dimensions, and to generate the min between the first input and the second input, each of the plurality of second circuit is further configured to: generate an output vector including min values of the vectors at each corresponding dimension.

In some aspects, the accelerator may further include: a weight matrix generating circuit configured to generate weights for vector reduction operations, wherein the vector reduction operations include one or more of reduce mean, reduce minimum, reduce maximum, reduce average, reduce add, or pooling.

In some aspects, each of the plurality of weight selectors includes a multiplexer coupled with the weight matrix generating circuit and a weight cache.

In some aspects, the each of the plurality of weight selectors is configured to: in response to the control signal indicating performing the convolution computation, obtain a weight from the weight cache; and in response the control signal indicating performing the vector computation, obtain a weight from the weight matrix generating circuit.

In some aspects, the accelerator may further include an adder-subtractor circuit outside the tree corresponding to the MAC lane, wherein the adder-subtractor circuit is configured to receive data from the second circuit at a root level of the MAC lane and to write the data into the output buffer.

In some aspects, the adder-subtractor circuit is further configured to: during a first iteration of computation, write a first set of data received from the second circuit at the root level of the MAC lane into the output buffer; and during a second iteration of computation: receive a set of temporary data from the second circuit at the root level of the MAC lane, retrieve the first set of data from the output buffer, compute a second set of data based on the set of temporary data, the first set of data, and a control signal indicating whether to perform a convolution computation or a vector operation, and write the second set of data into the output buffer.

In some aspects, the plurality of MAC lanes are configured to respectively receive a plurality of weight vectors generated by the weight matrix generating circuit for performing a plurality of vector operations in parallel.

In some aspects, a first subset of the plurality of MAC lanes are configured to receive weights from a weight cache and a second subset of the plurality of MAC lanes are configured to receive weights generated by the weight matrix generating circuit, and the first subset of the plurality of MAC lanes are further configured to perform convolution computations and the second subset of the plurality of MAC lanes are further configured to perform vector operations, and the convolution computations and the vector operations are performed in parallel.

In some aspects, the techniques described herein relate to a hybrid convolution-vector operation processing system. The system may include: a plurality of weight selectors configured to obtain weights; a plurality of activation input interfaces configured to obtain activations; and a plurality of Multiplier-Accumulation (MAC) circuits organized as a plurality of MAC lanes. Each of the plurality of MAC lanes configured to: receive a control signal indicating whether to perform convolution or vector operations; receive one or more weights from at least one of the plurality of weight selectors according to the control signal; receive one or more activations from at least one of the plurality of activation input interfaces according to the control signal; and generate output data based on the one or more weights and the one or more input activations according to the control signal and feed the output data into an output buffer, wherein: each of the plurality of MAC lanes includes a plurality of first circuits for performing multiplication operations and a plurality of second circuits for performing addition or subtraction operations according to the control signal.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
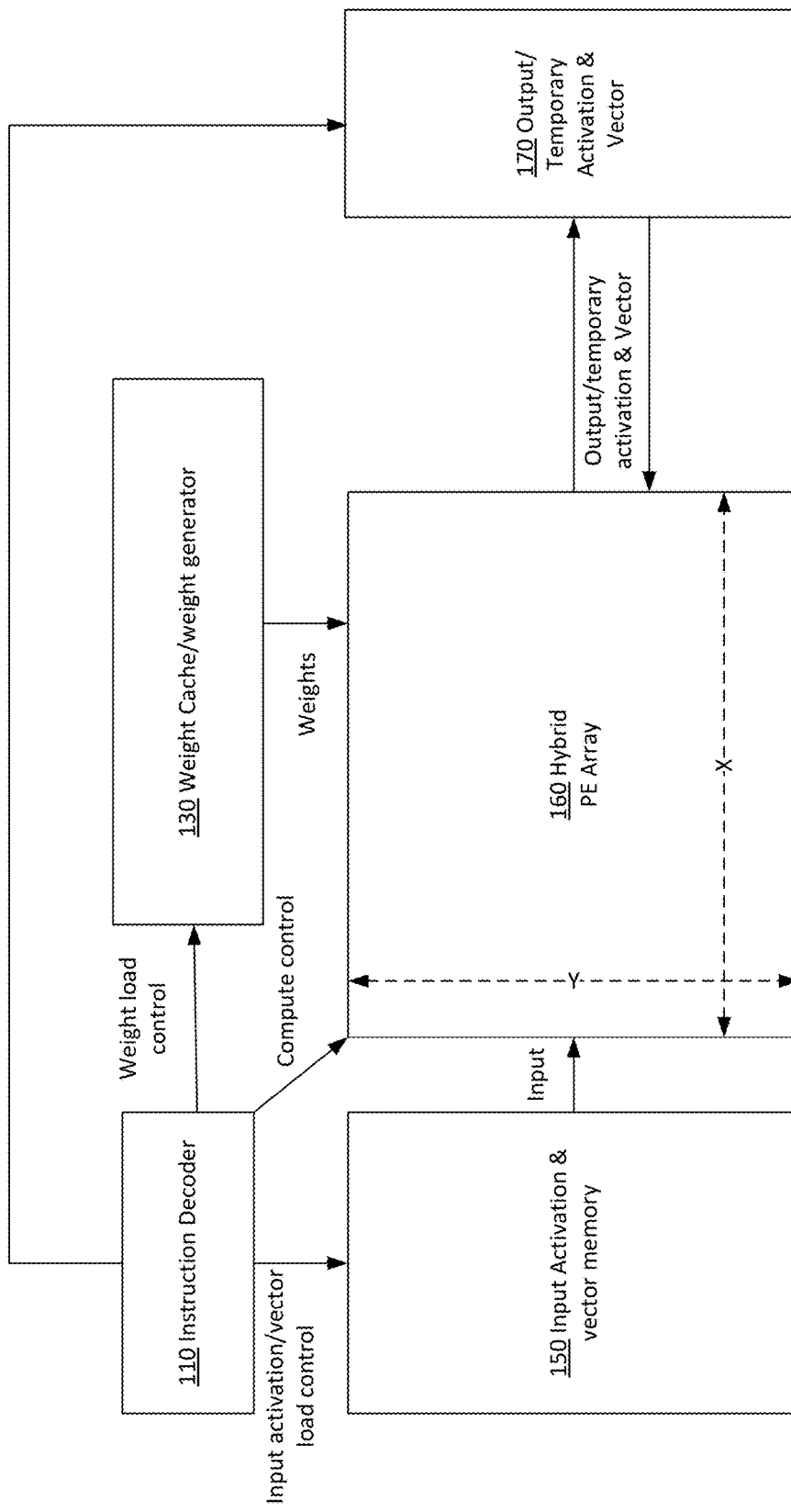
FIG. 1 illustrates an exemplary system diagram for processing neural network computations in a hybrid PE array in accordance with various embodiments.

Embodiments described herein provide hardware devices, systems, PE (Processing Entity) arrays with capabilities of performing various neural network computations in parallel by reusing hardware resources. Here, the neural network computations involve convolution computations and vector operations such as vector reduce operations (e.g., reduce max/min/sum/mean with regards to values in the vector, or reduce max/min with regards to index of the vector) and pooling operations (e.g., max pooling, average pooling), which constitute almost all of the computations involved in neural network trainings and applications. In some embodiments, the hardware device described herein includes arrays of PEs along with other auxiliary logic circuits, and is capable of handling different types of neural network computations by reusing the same hardware resources. For simplicity, the hardware device may be referred to as a hybrid PE array in the following design. In some embodiments, the auxiliary logic circuits may include a weight matrix generating circuit configured to generate functional weights (in comparison to the weights in the neural network).

While the existing NN hardware designs use SIMD vector processors or standalone/separate hardware (e.g., TPUs) for handling vector operations in addition to the processors configured for performing convolution computations, the hybrid PE array described herein reuses the same hardware resources, such as multiplier-accumulators (MACs), for performing convolution operations, and at the same time, offering scalable vector operation parallel processing capabilities. In particular, the MAC resources may be configured through control signals to perform either summations or comparison, in which the summations functionalities may be triggered for implementing convolution computations, vector sum reduction (e.g., adding corresponding values of multiple input vectors and generating an output vector with the sums), vector mean reduction (e.g., adding corresponding values of multiple input vectors and generating an output vector with the sums divided by the number of input vectors), or average pooling (e.g., calculating the average for each patch of the feature map), etc., and the comparison functionalities may be triggered for implementing vector max reduction, vector min reduction, or max pooling (e.g., finding the maximum value within each patch of the feature map), etc.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

FIG. 1 illustrates an exemplary system diagram for processing neural network computations in a hybrid PE array 160 in accordance with various embodiments. The diagram in FIG. 1 illustrates a hardware architecture that is configurable to perform common neural network computations such as convolution computations and vector operations using the same hardware resources (e.g., the hybrid PE array 160). The embodiments described in this disclosure may be implemented as a part of the neural network computations in FIG. 1 or other suitable environments.

A typical neural network such as convolution neural network (CNN) may involve various computations such as convolution and vector operations. For instance, a convolution layer within a neural network (e.g., a CNN) may typically conduct convolutions based on one or more input feature maps (IFMs) (comprising activations) obtained from an input source (e.g., such as an input image) or a previous layer (e.g., such as a tensor output from the previous layer) and one or more weight tensors corresponding to the given layer (e.g., from a weight source 130 such as a weight cache or a weight generator). The weight tensors may be used to convolve through the IFMs to extract various features (e.g., convolution computations). The convolution process may be carried out in parallel in the hybrid PE array 160. Each PE may refer to a processor with processing capability and storage capacity (e.g., buffer or cache). In some embodiments, each PE may include one or more logic gates or circuits that are configured as multipliers and accumulators (MACs). The PEs in the hybrid PE array 160 may be interconnected with wires, and may be arranged into a plurality of lanes called PE lanes or MAC lanes. The hybrid PE array 160 may be manufactured as a neural network accelerator or a data processing system.

As another example, a pooling layer in the CNN may provide an approach to down sampling the IFMs by summarizing the presence of features in patches of the feature map. Common pooling methods such as average pooling and max pooling may summarize the average presence of a feature and the most activated presence of a feature respectively. These pooling operations may involve vector operations that are different the convolution computations. In particular, the convolution computations include convolving a window through the IFMs and performing multiplications and accumulations to extract features, whereas vector operations may include comparisons or subtractions. Other types of vector operations are also common in neural networks, such as vector reduction operations. The vectors to be processed may be obtained from a vector memory (a type of input source 150), which may be a same source from which the activations are obtained for convolution. In some embodiments, the MACs in the hybrid PE array 160 may be configured to switch between "convolution mode" and "vector mode" to perform convolution computations and vector operations to serve convolution layers and pooling layers, respectively.

The configuration of the hybrid PE array 160 may be based on controlling signals or instructions issued by an instruction decoder 110. The instruction decoder 110 may decode the instructions from upper-level processors such as CPUs or GPUs. The instruction decoder 110 may send, based on the decoded instructions, corresponding control signals to different components. For instance, the instruction decoder 110 may send input activation/vector load control signals to the input source 150 indicating whether to fetch activations or vectors for the hybrid PE array 160. The instruction decoder 110 may send weight load control signals to the weight source 130 indicating whether the weights should be fetched from a weight cache or obtained from a weight matrix generator (more details in FIG. 2B). Different weights play critical roles in the neural network computations. For instance, the weights fetched from the weight cache may refer to the weights from the filters corresponding to a convolution layer, which are configured to extract features from IFMs. The weights generated from the weight matrix generator may be designed to perform a specific type of vector operations. That is, depending on whether the current operation is a convolution or vector operation, the source of the weights may be different. As another example, if the weights have a certain pattern, the instruction decoder 110 may instruct the weight matrix generator to generate the weights so that the weights are generated internally rather than being fetched from the weight cache. This may minimize external memory access and thus improve the overall performance of the neural network computation.

The instruction decoder 110 may also send compute control signals to the hybrid PE array 160 for performing the desired operations based on the input from the input source 150 and the weights from the weight source 130. The control signals may configure the MACs in the hybrid PE array 160 to perform summations (e.g., for convolutions) or subtractions (e.g., for comparisons in vector operations). After the hybrid PE array 160 completes the computations according to the control signal, the output data may be fed into an output buffer 170 for storing temporary activations or vectors. In some embodiments, the instruction decoder 110 may also control the output buffer for feeding data from a previous iteration back to the hybrid PE array 160 to be involved in a current iteration.

Figure 2A:
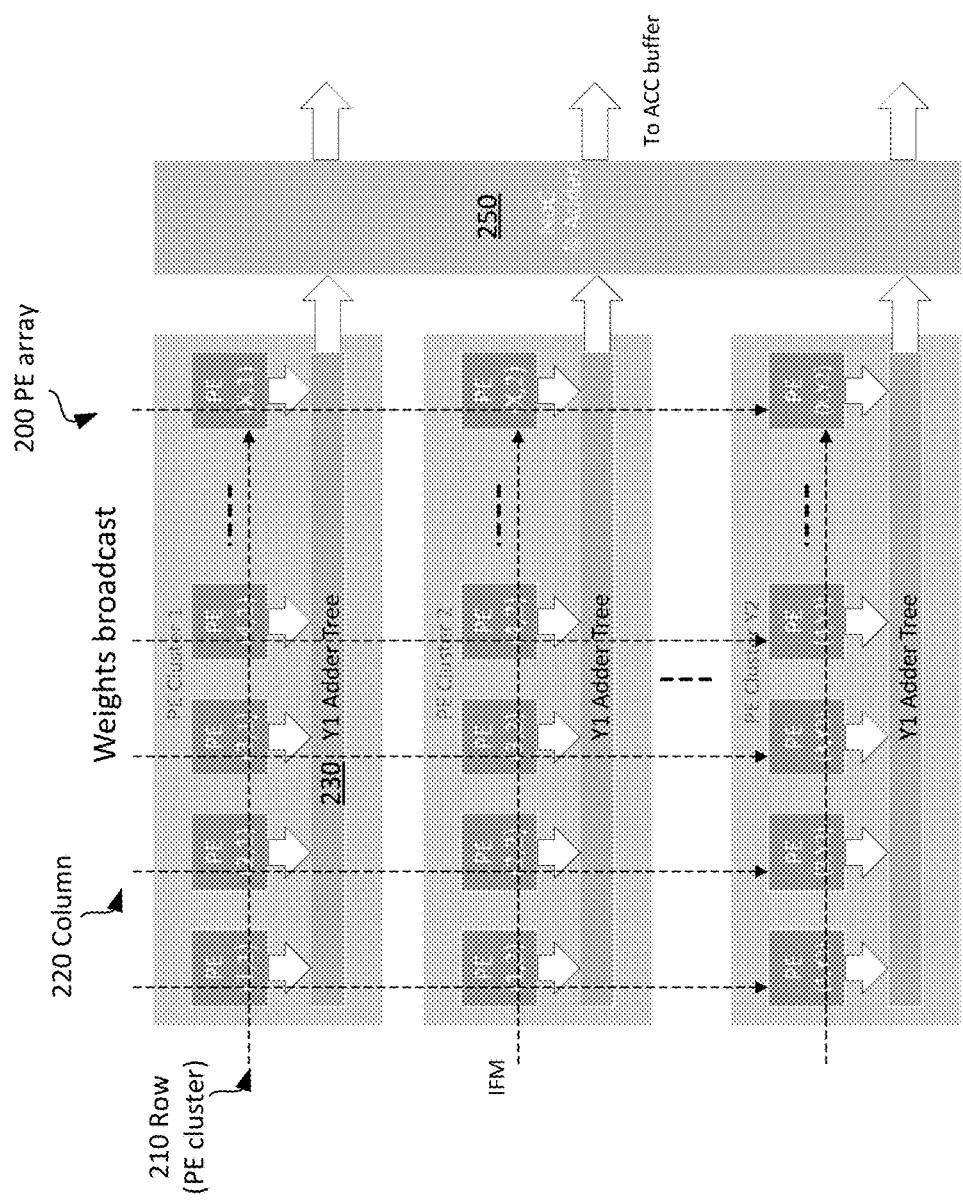
FIG. 2A illustrates an exemplary architectural diagram of a PE array in accordance with various embodiments.

FIG. 2A illustrates an exemplary architectural diagram of a PE array in accordance with various embodiments. The arrangement of the PEs in the PE array in FIG. 2A is for illustrative purposes, and may be implemented in other ways depending on the use case.

As shown on the left portion of FIG. 2A, the PE array 200 may include a matrix of PEs. Each PE may include a plurality of multipliers (MUL gates). The multipliers within each PE may work in parallel, and the PEs within the PE array 200 may work in parallel. For ease of reference, the following description denotes the number of columns 220 of PEs in the PE array 200 as X, the number of rows 210 of PEs in the PE array 200 as Y2, and the number of multipliers within each PE as Y1. Each row 210 of PEs may be referred to as a PE cluster, and each PE cluster may be coupled to Y1 Adder-trees 230 for aggregating the partial sums generated by the multipliers within the PE cluster. That is, the first multiplier in each PE within the PE cluster are coupled to the first Adder-tree 230 for aggregation, and the second multiplier in each PE within the PE cluster are coupled to the second Adder-tree 230 for aggregation, and so on. The aggregation results from the Adder-trees 230 across all PE clusters (total Y1×Y2 Adder-trees) may be fed into an Adder 250 for aggregation. The adder 250 may refer to a digital circuit performing addition of numbers that is part of the Network-on-Chip (NoC) subsystem.

Figure 2B:
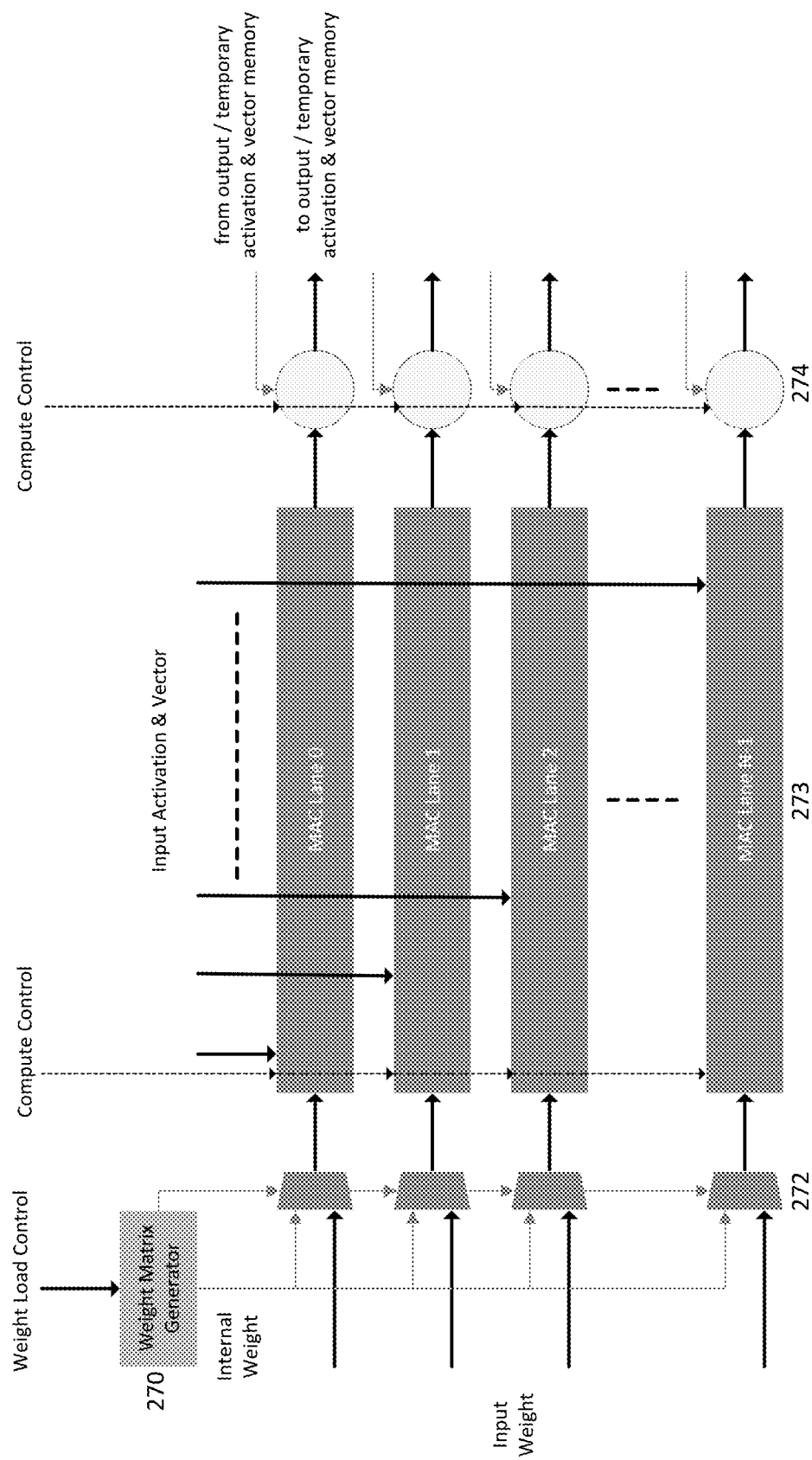
FIG. 2B illustrates an exemplary architectural diagram of a hybrid PE array for processing both convolution computations and vector operations in accordance with various embodiments.

FIG. 2B illustrates an exemplary architectural diagram of a hybrid PE array for processing both convolution computations and vector operations in accordance with various embodiments. The exemplary diagram includes a plurality of hardware components interacting with each other, such as a weight matrix generator 270, a plurality of weight selectors 272 configured to receive weights from either the weight matrix generator 270 or a weight cache (not shown in FIG. 2B), a plurality of MAC (multiplier-accumulator circuits) lanes 273 respectively corresponding to the plurality of weight selectors 272, and a plurality of MACs 274 for receiving data respectively from the plurality of MAC lanes 273 and outputting data to an output buffer (not shown in FIG. 2B). These components are for illustrative purposes only, and depending on implementations, the architecture may include more, fewer, or alternative components. For instance, the plurality of MACs 274 may be implemented as the last MACs in the plurality of MAC lanes, but with different configurations than the other MACs in the MAC lanes. The weight selectors 272 may be implemented using multiplexers coupled with the weight matrix generator 270 and the weight cache.

All of the components shown in FIG. 2B are directly or indirectly controlled by controlling signals from an instruction decoder (e.g., instruction decoder 110 in FIG. 1). The controlling signals may include weight load control and compute control for configuring the hybrid PE array to perform either convolution computations or vector operations, or both, using the plurality of MAC lanes 273. For instance, if the upper application layer instructs to perform convolution computation, the corresponding load control may be sent to the plurality of weight selectors 272 and notifying them to select weights from the weight cache. The weights from the weight cache may be from the filters of a convolution layer in a neural network, and may be used to convolve through IFMs to extract features. If the upper application layer instructs to perform vector operations such as vector reduction (e.g., vector mean that merges multiple vectors into one with mean values), the weight load control may be sent to the weight matrix generator 270 for generating weights, and the weight selectors 272 may be configured to select the generated weights and block the weights from the weight cache. These generated weights may be functionally different from the weights for convolution computation. For instance, the generated weights may be used to compute the mean values of input vectors (e.g., for X number of vectors, each vector may be assigned with 1/X of weight). In some embodiments, the weight matrix generator 270 may also be triggered for convolution computations if the involved weights are highly organized (following a specific pattern). The weight matrix generator 270 may be instructed to generate these weights following the specific pattern for the MAC lanes. This way, the MAC lanes may avoid accessing weight cache for the weights, thereby avoiding memory access latencies. The weight selectors 272 may then forward the received weights to the MAC lanes for corresponding computation.

Similarly, the plurality of MAC lanes 273 may be controlled by the compute control signals. The compute control signals may instruct the MAC lanes to receive input activations for convolution computations or vectors for other vector operations. In some embodiments, some of the MAC lanes (also called a first subset of the MAC lanes) may be configured for convolution computations and other MAC lanes (also called a second subset of the MAC lances) may be configured for vector operations, in parallel. It means, the hybrid PE array may perform both convolution computations and vector operations at the same time (e.g., during the same iteration). The compute control signals may further configure the MACs in each lane according to the specific workload to be performed. For instance, for convolution computation on a MAC lane, the multipliers in the MAC lane may perform multiplications and the accumulators in the MAC lane may perform summations, as part of the convolution computation. For vector reduction such as vector max reduction or max pooling in a neural network pooling layer, the multipliers in the MAC lane may perform multiplications (with weights generated by the weight matrix generator) and the accumulators in the MAC lane may be configured to perform subtractions in order to realize the functionalities of comparison. The comparisons may help to determine the max value at each dimension of the input vectors (for vector max reduction) or the max value within each patch of feature map (for max pooling). In some embodiments, the accumulators in the MAC lanes are designed to be configurable to perform either summation or subtraction. More detailed circuit design of the hybrid accumulators may be found in FIG. 4.

In some embodiments, the last layer MACs 274 may act as a bridge between the MAC lanes and the output buffer. For instance, the MACs 274 may receive data from the MAC lanes (e.g., partial sums, temporary activations, temporary vector outputs) and save the data to corresponding output buffers. In some cases, after the MACs 274 store data into the output buffer in a first iteration, they may also read the data from the output buffer back in as a part of the computation for a next iteration along with the new data received from the MAC lanes 273.

Figure 3:
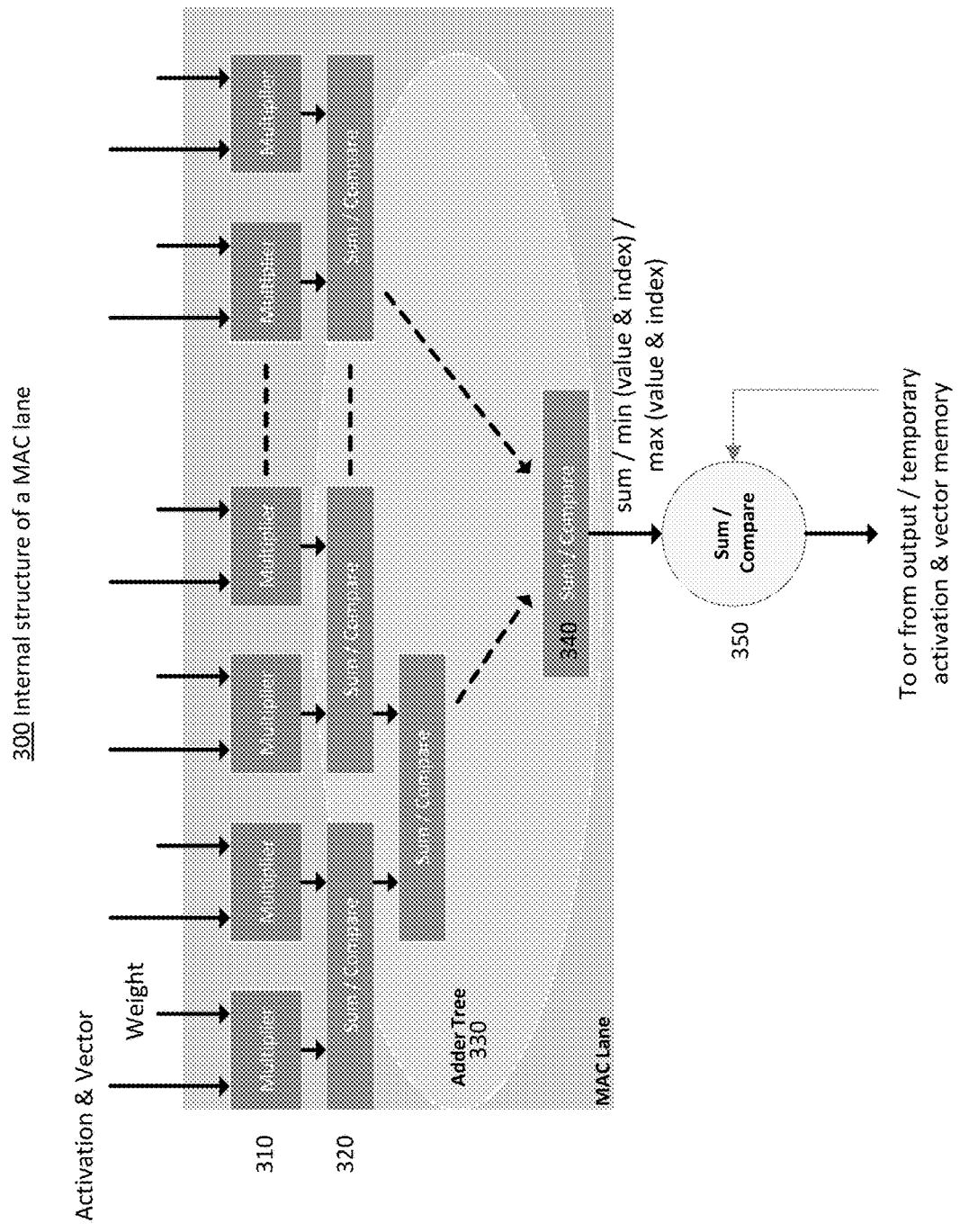
FIG. 3 illustrates an exemplary internal structural diagram of a MAC (Multiplier-Accumulator) lane in the hybrid PE array in accordance with various embodiments.

FIG. 3 illustrates an exemplary internal structural diagram of a MAC (Multiplier-Accumulator) lane 300 in the hybrid PE array in accordance with various embodiments. The diagram in FIG. 3 is for illustrative purposes only, and may include more, fewer, or alternative components depending on implementation. As described above, each MAC lane 300 may include a plurality of multipliers 310 and accumulators, which may be implemented as digital gates or circuits (e.g., arithmetic logic units (ALUs)). The accumulators are designed to perform not only summations but also subtractions according to specific compute instructions from upper layer. This way, the same piece of hardware (MAC lane 300) may be reused for different types of computations without additional special processors (e.g., vector processor, TPU). In this application, the accumulators may also be called as adder-subtractor circuits 320 because of their hybrid functionalities: sum (summation) and compare (subtraction).

In some embodiments, the adder-subtractor circuits 320 in the MAC lane 300 may be organized as an adder-tree 330. The leaf-level adder-subtractor circuits of the adder-tree 330 may be configured to receive data from the plurality of multipliers 310. For instance, each multiplier 310 may perform multiplications (for either convolution or vector operations) based on the input vector/activation and weights. The outcome of the multiplications from two or more multipliers 310 may be fed into the leaf-level adder-subtractor circuits of the adder-tree 330 for summation or subtraction (comparison) according to control signals. For instance, each adder-subtractor circuit 320 may be configured to receive a first input and a second input; determine whether to perform addition or subtraction based on the control signal; in response to the control signal indicting performing addition, generate a sum or an average of the first input and the second input; and in response to the control signal indicating performing subtraction, generate a min or max between the first input and the second input. If the control signal instructs to perform a vector min reduction, the first input and the second input may each include a vector with a same number of dimensions, and the adder-subtractor circuit may generate an output vector comprising min values of the vectors at each corresponding dimension.

In some embodiments, the adder-tree 330 may include multiple adder-subtractor circuits 320 at the leaf level, one adder-subtractor circuit 340 at the root level, and one or more intermediate levels. The number of adder-subtractor circuits reduces by half from one level to a next level. In some embodiments, the root adder-subtractor circuit 340 may obtain a computation result (e.g., sum, min or max of values or indices) of the adder-tree 330, and sends the result to an adder-subtractor circuit 350 outside of the adder-tree 330 corresponding to the MAC lane. The outside adder-subtractor circuit 350 may be the similar as the adder-subtractor circuitries within the adder-tree 330, except that the outside adder-subtractor circuit 350 may write to and read from an output buffer. In some embodiments, the outside adder-subtractor circuit 350 and the root adder-subtractor circuit 340 may be the same circuit and as part of the adder-tree 330.

In some embodiments, during a first iteration of computation, the outside adder-subtractor circuit 350 may be configured to write a first set of data received from the root adder-subtractor circuit into the output buffer. During a second iteration of computation, the outside adder-subtractor circuit 350 may be configured to again receive a set of temporary data from the root adder-subtractor circuit 350, retrieve the first set of data from the output buffer, compute a second set of data based on the set of temporary data, the first set of data, and a control signal indicating whether to perform a convolution computation or a vector operation, and write the second set of data into the output buffer.

Figure 4:
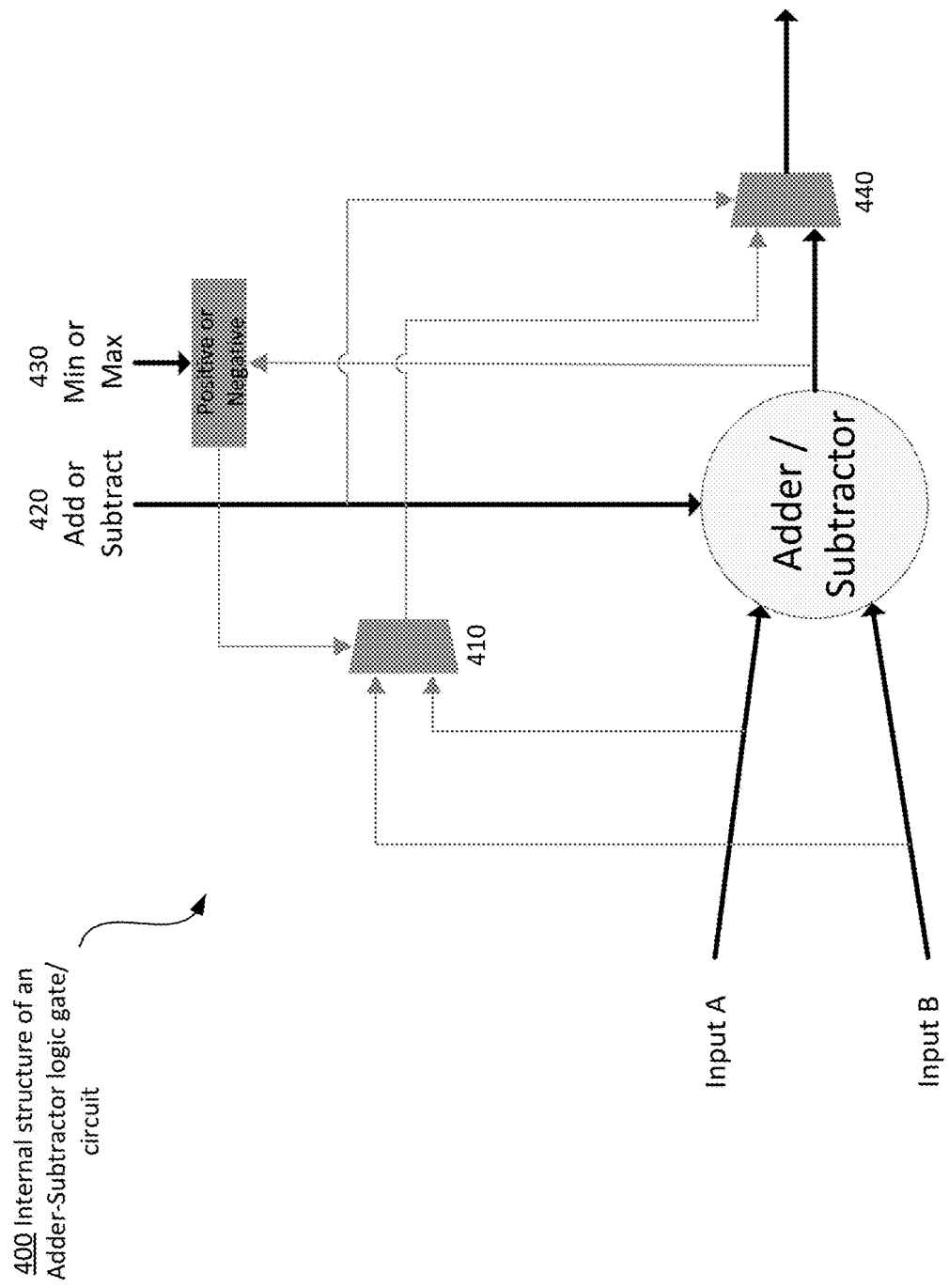
FIG. 4 illustrates an exemplary logic circuit design of an Accumulator and Subtractor in each MAC lane in accordance with various embodiments.

FIG. 4 illustrates an exemplary logic circuit design 400 of an Accumulator and Subtractor in each MAC lane in accordance with various embodiments. The design 400 demonstrates one way of implementing the hybrid circuit that may be configured to perform either addition or subtraction. Depending on the implementation, the hybrid circuit may be implemented using other digital components.

As shown, the example circuit include a plurality of multiplexers 410 and 440 for selecting signals from multiple inputs based on control signals. The control signals may include a first signal 420 indicating whether an addition or a subtraction is being performed, and a second signal 430 indicating (if a subtraction is being performed), whether to obtain the min or max value from the input values. These signals may control the selection logic of the multiplexers 410 and 440 to select the proper input.

Figure 5A:
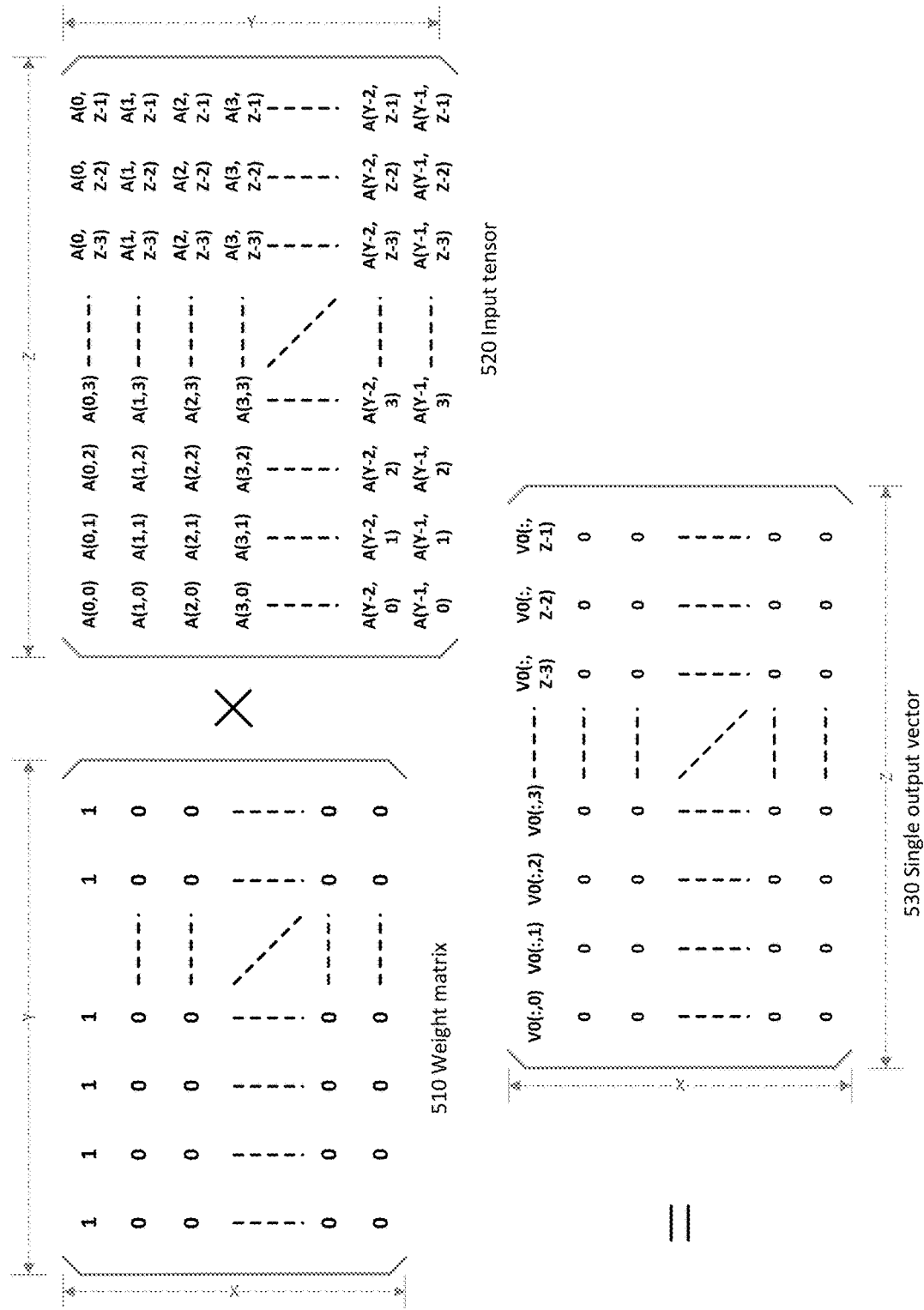
FIG. 5A illustrates an exemplary use case for performing a vector reduction using the hybrid PE array in accordance with various embodiments.

FIG. 5A illustrates an exemplary use case for performing a vector reduction using the hybrid PE array in accordance with various embodiments. While the hybrid PE array is used for convolution computations in convolution layers of neural networks, it may also be used for other types of computations such as vector reduction, which require different logic processing. The illustrated use case in FIG. 5A involves a vector reduction across a channel dimension of an input tensor 520 that generates a single output vector 530. The single output vector 530 may include a row of vectors, denoted as V0(:0) to V0(:,z−1)), where z is a channel dimension index. The weight matrix 510 used for vector reduction may be generated by a weight generating circuit. As shown, the weight matrix 510 may include a first row of 1s and all other elements as 0s, while the input tensor 520 include a plurality of vectors. Please note that even though the operator in FIG. 5A is a multiplication operator, it represents the vector operator rather than a matrix multiplication. The vector operator may be defined as part of the compute control signal, which may include vector sum reduction, vector min or reduction, etc. For simplicity, the vector reduction operator may be denoted as a "reduce0" function. With the "reduce0" function, each column of vectors in the input tensor 520 may be used as parameters of the "reduce0" function. For instance, the first vector, V0(:0), of the single output vector may be represented as reduce0 (A(0,0), A(1,0), . . . , A(y−1,0)), where y refers to one of the row or column dimension of the input tensor 520, and "reduce0" may be a sum, min, max, mean, etc. This example shows a simple application of the hybrid PE array for a channel-dimension vector reduction.

Figure 5B:
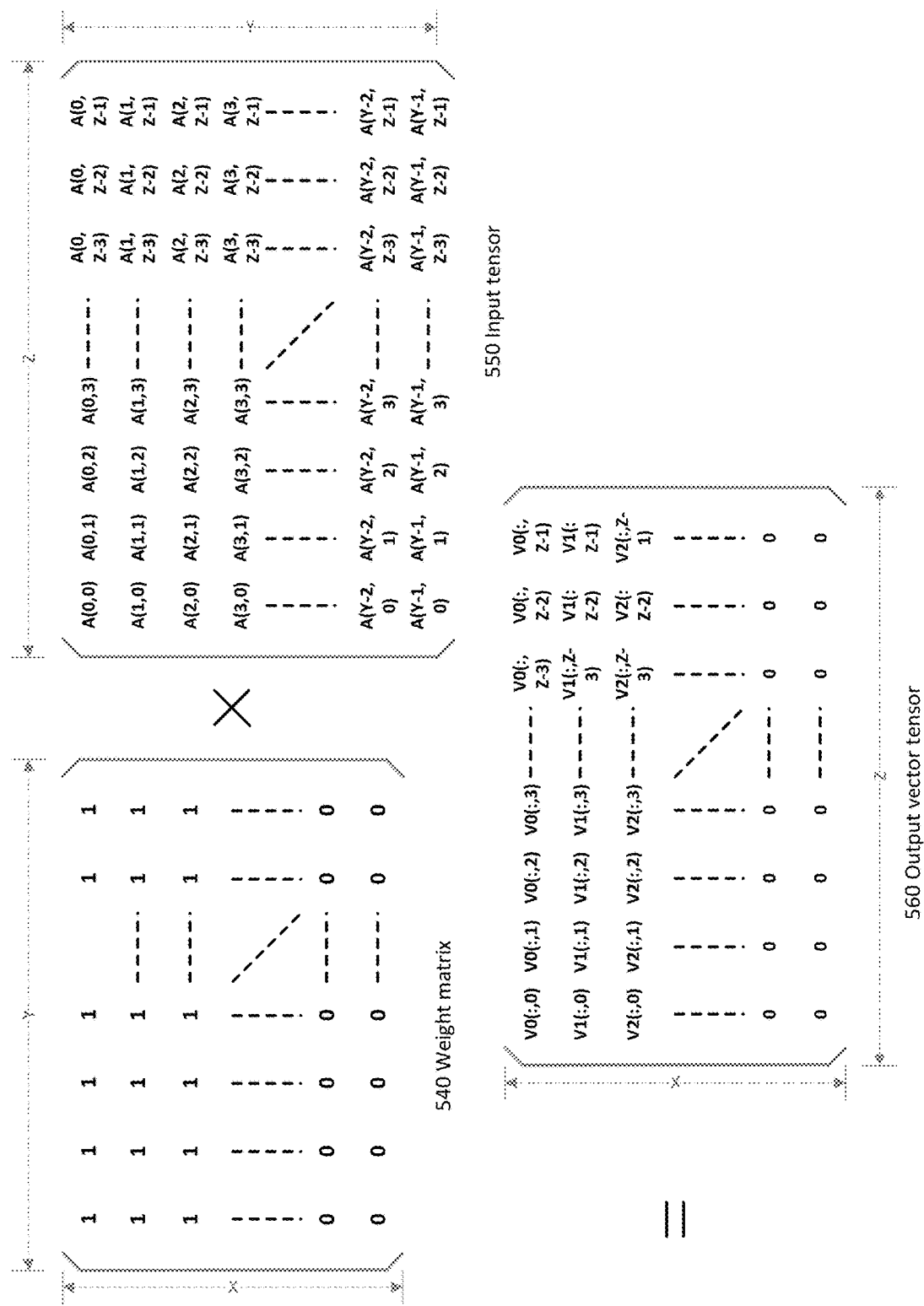
FIG. 5B illustrates another exemplary use case for performing a plurality of vector reductions in parallel using the hybrid PE array in accordance with various embodiments.

FIG. 5B illustrates another exemplary use case for performing a plurality of vector reductions in parallel using the hybrid PE array in accordance with various embodiments. The example in FIG. 5B demonstrates that the hybrid PE array is highly flexible because of the rich dynamics in the weight matrix 540. Depending on the requirements from the upper level application, the weight matrix generating circuit may generate multiple weight rows in the weight matrix 540 to implement parallel vector reduction operations. Two weight rows may include different weights to achieve two different vector reductions. For instance, row 0 including all 1s in the weight matrix 540 may correspond to a vector sum reduction, which may be used to generate V0(:0)=sum(A(0, 0), A(1,0), . . . A(y−1,0)) with the input tensor 550, where y refers to one of the row or column dimension of the input tensor 520; and row 1 including all 1/y may correspond to a vector mean reduction, which may be used to generate V1(:0)=sum(A(0,0), A(1,0), . . . A(y−1,0))/y. The output vectors V0(:0) and V1(:0) may be stored in the output vector tensor 560.

In some embodiments, the weight matrix 540 may include first rows of weights generated by the weight matrix generating circuit for vector operations, and second rows of weights fetched from a weight cache for convolution computations. This way, one weight matrix 540 may be used to trigger both vector operations and convolution computations in parallel. In particular, the "multiplication" operator in FIG. 5B may include an array of operators that includes vector reduction operators corresponding to the first rows and multiplication operator (for convolution) corresponding to the second rows. This example shows that the hybrid PE array may be configured to perform multiple same vector reductions, multiple different vector reductions, or a mixed vector reductions and convolutions, during a single computation cycle.

Figure 5C:
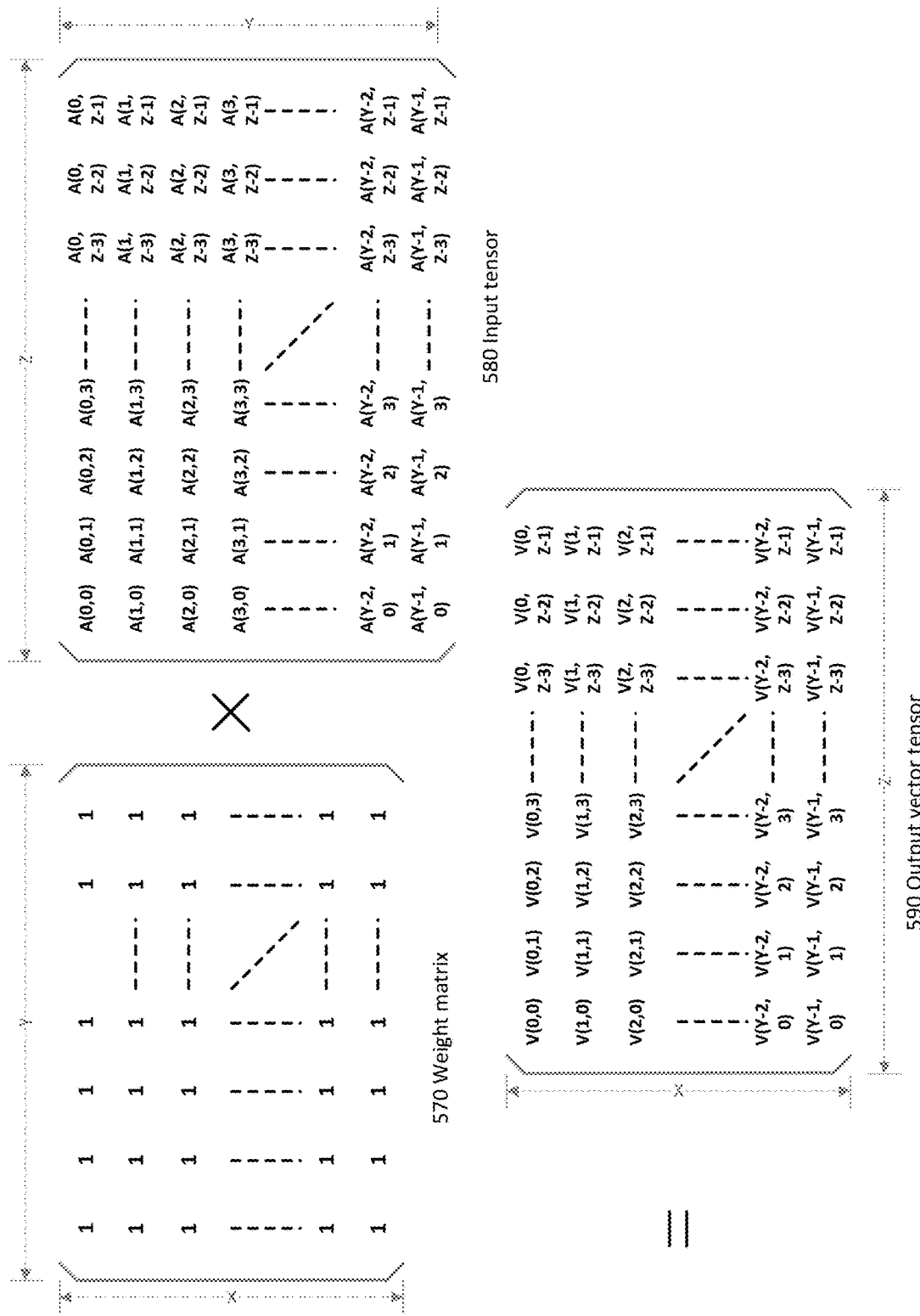
FIG. 5C illustrates another exemplary use case for performing pooling using the hybrid PE array in accordance with various embodiments.

FIG. 5C illustrates yet another exemplary use case for performing pooling using the hybrid PE array in accordance with various embodiments. The use case in FIG. 5C involves pooling operations. Pooling operations are common in neural networks for down-sampling feature maps by summarizing the presence of features in patches (e.g., patches with a size of 3✕3) of the feature map. Pooling operations may be implemented as vector operations when the patches are represented in vectors. To do this, the hybrid PE array may first convert the patches into vectors, and organize the vectors as the input tensor 580 according to a corresponding control signal. Generally the pooling process involves convolving a patch (e.g., a 3✕3 patch) through the activation tensor, but the convolving step may be less than the size of the patch. Therefore, the vectors in the input tensor 580 may have overlapping elements. The weight matrix 570 may include weights generated from the weight generating circuit, in which some rows of weights may be configured to perform one type of pooling (e.g., sum pooling) and other rows of weights may be configured to perform another type of pooling (e.g., max pooling). With the weight matrix 570 and the input tensor 580, multiple pooling computations may be executed using the same PE array during the same computation cycle. The output vectors may be stored in the output vector tensor 590.

Figure 6:
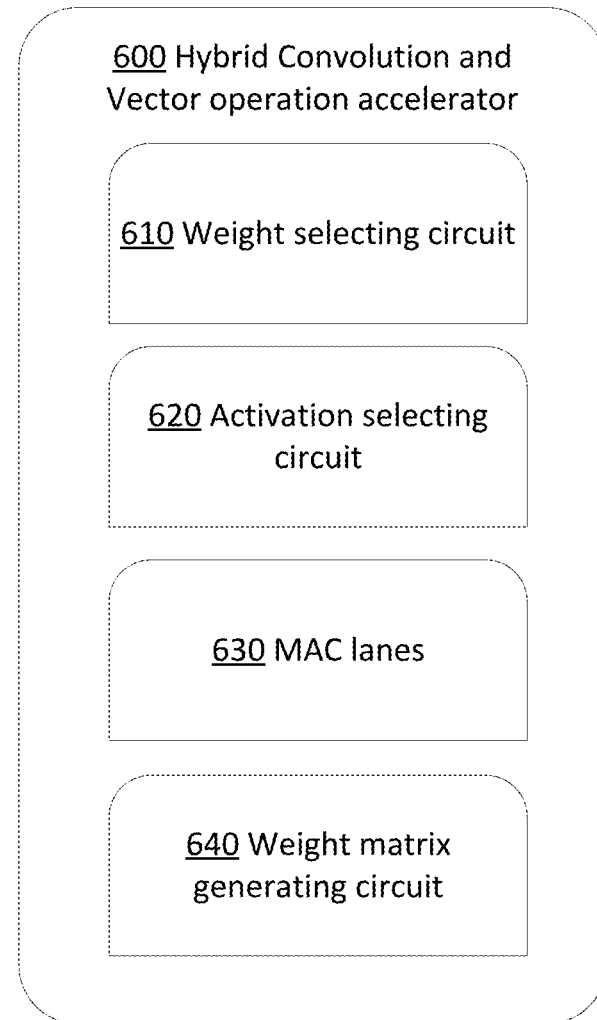
FIG. 6 illustrates an exemplary system design of the hybrid PE array in accordance with various embodiments.

FIG. 6 illustrates an exemplary system design of the hybrid PE array in accordance with various embodiments. The hybrid PE array may be implemented as a hardware accelerator 600. The components of the accelerator 600 in FIG. 6 are for illustrative purposes only. Depending on the implementation, the accelerator 600 may include more, fewer, or alternative components. In some embodiments, the accelerator 600 may include all or some of the components in FIG. 1, FIG. 2A, and FIG. 2B, such as the MAC lanes. Each MAC lane in the accelerator 600 may include a plurality of multipliers and an adder tree as shown in FIG. 3. The adder tree may include a plurality of multi-functional adder-subtractors as shown in FIG. 4.

From functional perspective, in some embodiments, the accelerator 600 may include a weight selecting circuit 610, an activation selecting circuit 620, a plurality of MAC lanes 630, and a weight matrix generating circuit 640. In some embodiments, the weight selecting circuit 610 may be implemented as multiplexers, and coupled with the weight matrix generating circuit 640 and a weight cache, denoted as two weight sources. The weight selecting circuit 610 may be instructed to obtain weights from these two weight sources according to a control signal. For different types of computations, the weights may be obtained from different sources. The activation selecting circuit 620 may be configured to obtain activations or vectors according to another control signal, depending on the target computation (e.g., convolution, pooling, vector operations).

In some embodiments, each of the MAC lanes 630 may be configured to receive a control signal indicating whether to perform convolution or vector operations; receive one or more weights from at least one of the plurality of weight selectors according to the control signal; receive one or more activations from at least one of the plurality of activation input interfaces according to the control signal; and generate output data based on the one or more weights and the one or more input activations according to the control signal and feed the output data into an output buffer, wherein: each of the plurality of MAC lanes comprises a plurality of first circuits for performing multiplication operations and a plurality of second circuits for performing addition or subtraction operations according to the control signal.

In some embodiments, the weight matrix generating circuit 640 may be configured to generate weights for vector reduction operations, wherein the vector reduction operations comprise one or more of reduce mean, reduce minimum, reduce maximum, reduce average, reduce add, or pooling.

Figure 7:
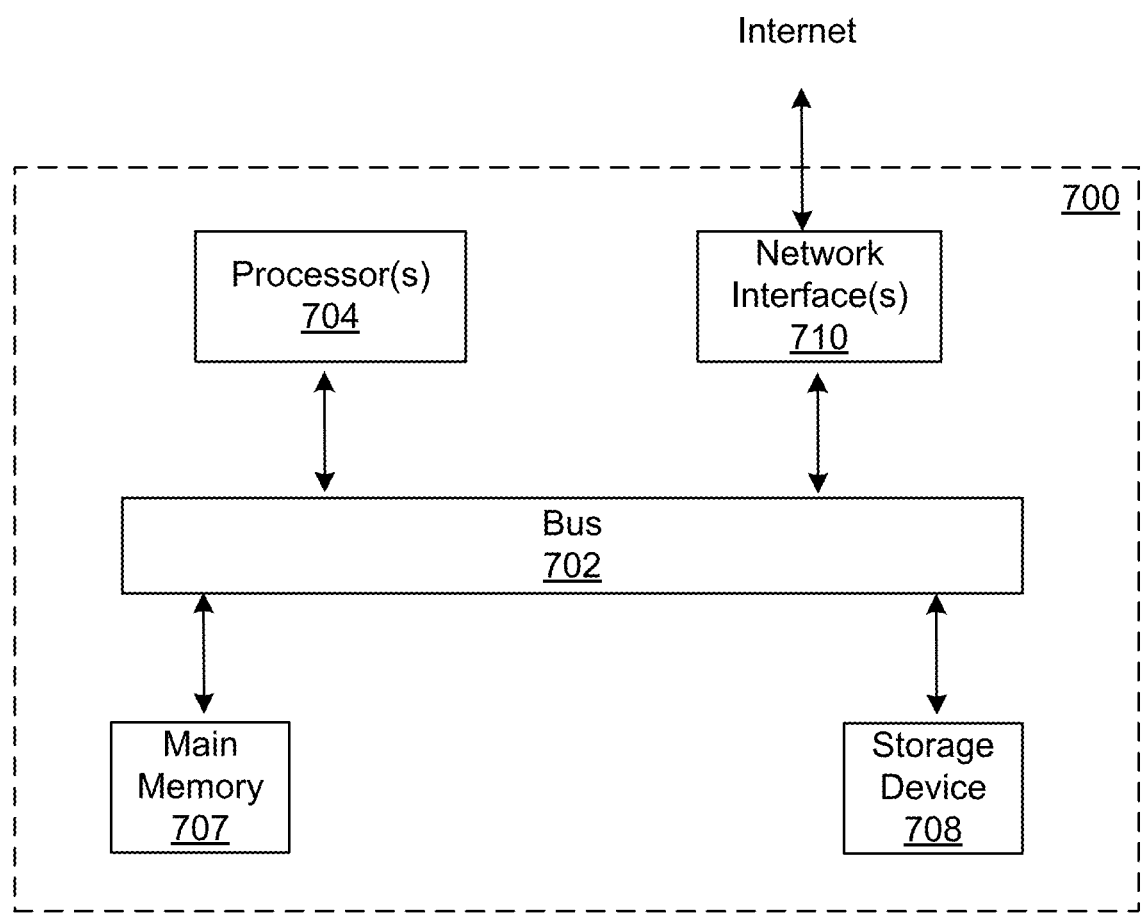
FIG. 7 illustrates an example computer system in which any of the embodiments described herein may be implemented.

FIG. 7 illustrates an example computing device in which any of the embodiments described herein may be implemented. The computing device may be used to implement one or more components of the systems and the methods shown in FIGS. 1-6. The computing device 700 may comprise a bus 702 or other communication mechanisms for communicating information and one or more hardware processors 704 coupled with bus 702 for processing information. Hardware processor(s) 704 may be, for example, one or more general-purpose microprocessors.

The computing device 700 may also include a main memory 707, such as random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 708. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuit may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may" unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A dual-operation neural network accelerator, comprising:
    a plurality of Multiplier-Accumulation (MAC) circuits organized as a plurality of MAC lanes, wherein each of the plurality of MAC lanes comprises:
        a plurality of first circuits for performing multiplication operations; and
        a plurality of second circuits organized as a tree comprising a root level and a leaf level, the root level comprising one second circuit and the leaf level comprising multiple second circuits, wherein:
            the multiple second circuits on the leaf level are configured to receive data from the plurality of first circuits and perform addition or subtraction operations on the received data, and feed results of the addition or subtraction operations towards the root level; and
            the second circuit on the root level is configured to generate an output based on results of the addition or subtraction operations, and send the output to an adder-subtractor circuit outside of the tree of the plurality of second circuits, wherein the adder-subtractor circuit is configured to read previous data from an output buffer, compute a new output based on the previous data and the output received from the second circuit on the root level, and write the new output to the output buffer;
            wherein each of the plurality of second circuits is a combination of an accumulator and a subtractor, and is configured to perform both addition and subtraction using a same circuit;
    wherein:
        each of the plurality of MAC lanes is configured to (1) fetch weights from a weight cache for convolution operations and (2) obtain weights generated by a weight matrix generating circuit for vector operations, and
        the weight matrix generating circuit is configured to internally generate a row of weights for one of the plurality of MAC lanes.

2. The dual-operation neural network accelerator of claim 1, wherein each of the plurality of second circuits comprises an adder-subtractor logic gate configurable to perform the addition or subtraction operations.

3. The dual-operation neural network accelerator of claim 2, wherein the plurality of second circuits are configured to receive a first control signal and a second control signal, wherein:
    the first control signal configures the adder-subtractor logic gate to perform addition or subtraction, and
    the second control signal configures the adder-subtractor logic gate to post-process a result of the addition or subtraction.

4. The dual-operation neural network accelerator of claim 1, wherein the second circuit on the root level is further configured to:
    read a previous output from a buffer of the dual-operation neural network accelerator that was generated from a previous iteration, and
    generating the output based on the previous output and the results of the addition or subtraction operations.

5. The dual-operation neural network accelerator of claim 1, further comprising:
    a plurality of weight selectors configured to obtain weights, and
    a plurality of activation input interfaces configured to obtain activations,
    wherein each of the plurality of MAC lanes is configured to:
        receive a control signal indicating whether to perform the convolution or the vector operations;
        receive one or more weights from at least one of the plurality of weight selectors according to the control signal;
        receive one or more activations from at least one of the plurality of activation input interfaces according to the control signal; and
        input the one or more weights and the one or more activations into the MAC lane of the plurality of MAC lanes to generate output data according to the control signal.

6. The dual-operation neural network accelerator of claim 5, wherein the vector operations comprise one or more of reduce mean, reduce minimum, reduce maximum, reduce average, reduce add, or pooling.

7. The dual-operation neural network accelerator of claim 6, wherein each of the plurality of weight selectors comprises a multiplexer coupled with the weight matrix generating circuit and the weight cache.

8. The dual-operation neural network accelerator of claim 7, wherein each of the plurality of weight selectors is configured to:
    in response to the control signal indicating performing the convolution operations, obtain a weight from the weight cache; and
    in response to the control signal indicating performing vector computation, obtain a weight from the weight matrix generating circuit.

9. The dual-operation neural network accelerator of claim 7, wherein a first subset of the plurality of MAC lanes are configured to receive weights from the weight cache and a second subset of the plurality of MAC lanes are configured to receive weights generated by the weight matrix generating circuit, and
    the first subset of the plurality of MAC lanes are further configured to perform convolution computations and the second subset of the plurality of MAC lanes are further configured to perform vector operations, and the convolution computations and the vector operations are performed in parallel.

10. The dual-operation neural network accelerator of claim 1, wherein each of the plurality of second circuits comprises a plurality of multiplexers for selecting signals from multiple inputs based on control signals, wherein the control signals comprise a first control signal indicating whether an addition or a subtraction is being performed, and a second control signal indicating whether to obtain a min or max value from input values.

11. A Multiplier-Accumulation (MAC) lane in a neural network accelerator, comprising:
a plurality of first circuits for performing multiplication operations; and
a plurality of second circuits organized as a tree comprising a root level and a leaf level, the root level comprising one second circuit and the leaf level comprising multiple second circuits, wherein:
the multiple second circuits on the leaf level are configured to receive data from the plurality of first circuits and perform addition or subtraction operations on the received data, and feed results of the addition or subtraction operations towards the root level; and
the second circuit on the root level is configured to generate an output based on results of the addition or subtraction operations, and send the output to an adder-subtractor circuit outside of the tree of the plurality of second circuits, wherein the adder-subtractor circuit is configured to read previous data from an output buffer, compute a new output based on the previous data and the output received from the second circuit on the root level, and write the new output to the output buffer;
wherein each of the plurality of second circuits is a combination of an accumulator and a subtractor, and is configured to perform both addition and subtraction using a same circuit;
wherein:
the MAC lane is configured to (1) fetch weights from a weight cache for convolution operations and (2) obtain weights generated by a weight matrix generating circuit for vector operations, and
the weight matrix generating circuit is configured to internally generate a row of weights for the MAC lane.

12. The MAC lane of claim 11, wherein each of the plurality of second circuits comprises an adder-subtractor logic gate configurable to perform the addition or subtraction operations.

13. The MAC lane of claim 12, wherein the plurality of second circuits are configured to receive a first control signal and a second control signal, wherein:
the first control signal configures the adder-subtractor logic gate to perform addition or subtraction, and
the second control signal configures the adder-subtractor logic gate to post-process a result of the addition or subtraction.

14. The MAC lane of claim 11, wherein the second circuit on the root level is further configured to:
read a previous output from a buffer of the neural network accelerator that was generated from a previous iteration, and
generating the output based on the previous output and the results of the addition or subtraction operations.

15. The MAC lane of claim 11, wherein the MAC lane is coupled with a plurality of weight selectors configured to obtain weights, and a plurality of activation input interfaces configured to obtain activations.

16. The MAC lane of claim 15, wherein the plurality of first circuits are configured to:
receive a control signal indicating whether to perform convolution or vector operations;
receive one or more weights from at least one of the plurality of weight selectors according to the control signal; and
receive one or more activations from at least one of the plurality of activation input interfaces according to the control signal.

17. A computer-implemented method, comprising:
receiving a control signal indicating whether to perform convolution or vector operations;
receiving one or more weights from at least one of a plurality of weight selectors according to the control signal;
receiving one or more activations from at least one of a plurality of activation input interfaces according to the control signal; and
inputting the one or more weights and the one or more activations into a Multiplier-Accumulation (MAC) lane to generate output data according to the control signal,
wherein the MAC lane comprises:
a plurality of first circuits for performing multiplication operations,
a plurality of second circuits organized as a tree comprising a root level and a leaf level, the root level comprising one second circuit and the leaf level comprising multiple second circuits,
the multiple second circuits on the leaf level are configured to receive data from the plurality of first circuits and perform addition or subtraction operations on the received data, and feed results of the addition or subtraction operations towards the root level, and
the second circuit on the root level is configured to generate the output data based on results of the addition or subtraction operations, and send the output to an adder-subtractor circuit outside of the tree of the plurality of second circuits, wherein the adder-subtractor circuit is configured to read previous data from an output buffer, compute a new output based on the previous data and the output received from the second circuit on the root level, and write the new output to the output buffer;
wherein each of the plurality of second circuits is a combination of an accumulator and a subtractor, and is configured to perform both addition and subtraction using a same circuit;
wherein:
the MAC lane is configured to (1) fetch weights from a weight cache for convolution operations and (2) obtain weights generated by a weight matrix generating circuit for vector operations, and
the weight matrix generating circuit is configured to internally generate a row of weights for the MAC lane.

18. The computer-implemented method of claim 17, wherein each of the plurality of second circuits comprises an adder-subtractor logic gate configurable to perform the addition or subtraction operations.

19. The computer-implemented method of claim 18, wherein the plurality of second circuits are configured to receive a first control signal and a second control signal, wherein:
the first control signal configures the adder-subtractor logic gate to perform addition or subtraction, and the second control signal configures the adder-subtractor logic gate to post-process a result of the addition or subtraction.

\* \* \* \* \*